United States Patent
Herrmann et al.

(10) Patent No.: US 11,260,449 B2
(45) Date of Patent: Mar. 1, 2022

(54) THREE-DIMENSIONAL PRINTING SYSTEM AND METHOD OF THREE-DIMENSIONAL PRINTING

(71) Applicant: XEROX CORPORATION, Norwalk, CT (US)

(72) Inventors: Douglas K. Herrmann, Webster, NY (US); Erwin Ruiz, Rochester, NY (US); Ali R. Dergham, Fairport, NY (US); Christopher D. Atwood, Webster, NY (US); Daniel R. Knopp, Williamson, NY (US); Derek A. Bryl, Churchville, NY (US); Linn C. Hoover, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 74 days.

(21) Appl. No.: 16/808,285

(22) Filed: Mar. 3, 2020

(65) Prior Publication Data

US 2021/0276082 A1  Sep. 9, 2021

(51) Int. Cl.
*B22D 23/00* (2006.01)
*B33Y 10/00* (2015.01)
*B33Y 30/00* (2015.01)

(52) U.S. Cl.
CPC ............ *B22D 23/003* (2013.01); *B33Y 10/00* (2014.12); *B33Y 30/00* (2014.12)

(58) Field of Classification Search
CPC .................................. B22F 12/17; C21D 1/84
See application file for complete search history.

(56) References Cited

U.S. PATENT DOCUMENTS

| 7,297,304 B2 * | 11/2007 | Swanson ............. B33Y 30/00 264/308 |
| 9,616,494 B2 | 4/2017 | Vader et al. |
| 10,040,119 B2 | 8/2018 | Vader et al. |

(Continued)

FOREIGN PATENT DOCUMENTS

| CN | 108857031 A | 11/2018 |
| EP | 3326789 A1 | 5/2018 |

OTHER PUBLICATIONS

Masterkidz, "Stacking Pyramid", Apr. 12, 2019, 1 page, retrieved Jul. 16, 2021, URL: <https://web.archive.org/web/20190412005825/http://www.masterkidztoys.com/index.php?route=product/product&path=12&product_id=222> (Year: 2019).*

(Continued)

*Primary Examiner* — Jacob J Cigna
(74) *Attorney, Agent, or Firm* — MH2 Technology Law Group LLP (57) ABSTRACT

A three-dimensional printing system includes a build platform comprising a build surface. The printing system also includes an enclosure system having a side portion extending entirely around the build surface, a top plate portion that abuts the side portion, and a bottom portion. The side portion, the top plate portion and the bottom portion form an enclosed space surrounding the build surface. The top plate portion is moveable so as to adjust a volume of the enclosed space. A 3D printer printhead is disposed adjacent to the enclosure system for depositing a print material onto the build surface. The printing system also includes a heating system for heating the enclosed space.

19 Claims, 7 Drawing Sheets

(56) References Cited

U.S. PATENT DOCUMENTS

| | | | | |
|---|---|---|---|---|
| 10,888,908 B2* | 1/2021 | Batchelder | ............ | B33Y 30/00 |
| 2004/0104515 A1* | 6/2004 | Swanson | ............... | B33Y 10/00 |
| | | | | 264/497 |
| 2009/0314391 A1* | 12/2009 | Crump | .................. | B33Y 10/00 |
| | | | | 148/523 |
| 2014/0194258 A1* | 7/2014 | Shorter | ............... | A63B 21/072 |
| | | | | 482/93 |
| 2017/0312849 A1 | 11/2017 | Yang et al. | | |
| 2018/0161873 A1 | 6/2018 | Brown et al. | | |
| 2019/0015884 A1* | 1/2019 | Batchelder | ............. | B22F 3/115 |
| 2020/0223129 A1* | 7/2020 | Galle | ................... | B29C 64/295 |

OTHER PUBLICATIONS

Sukhotskiy et al., "Magnetohydrodynamic Drop-on-Demand Liquid Metal 3D Printing," Solid Freeform Fabrication 2017: Proceedings of the 28th Annual International Solid Freeform Fabrication Symposium—An Additive Manufacturing Conference, pp. 1806-1811.

Karampelas et al., "Drop-on-Demand 3D Metal Printing," Informatics, Electronic and Microsystems: TechConnect Briefs 2017, pp. 153-155.

Vader Systems MK1 Printer Operator Manual 1.0, last revised Mar. 19, 2018, 114 pages.

ALIBABA.com—https://www.alibaba.com/product-detail/Extractable-Stainless-Steel-Plate-Protective-Machine_60447655689.html?spm=a2700.details.deiletai6.7.1aee53adcMcMys, dowloaded on Feb. 7, 2020.

Partial European Search Report dated Jul. 22, 2021 in corresponding European Application No. 21157968.5, 15 pages.

Extended European Search Report dated Oct. 26, 2021 in corresponding European Application No. 21157968.5, 13 pages.

* cited by examiner

THREE-DIMENSIONAL PRINTING SYSTEM AND METHOD OF THREE-DIMENSIONAL PRINTING

DETAILED DESCRIPTION

Field of the Disclosure

The present disclosure is directed to a three-dimensional printing system that includes a thermal containment system. A method of three-dimensional printing using a thermal containment system for heating a 3D object during fabrication is also disclosed.

Background

Conductive liquid three-dimensional printers for building 3D objects from molten aluminum are known in the art. An example of such a system is disclosed in U.S. Pat. No. 9,616,494. The system works by using a DC pulse applied by an electromagnetic coil to expel molten aluminum drops in response to a series of pulses. The platen to which the drops are targeted translates to allow for the drops to be connected and built up to produce a three-dimensional object.

However, the drops of molten aluminum sometimes do not combine smoothly or with sufficient bonding strength. Further, the 3D object can have an undesirable degree of porosity, as well as uneven build surfaces during fabrication, unwelded drops, and shape inconsistencies. All of these lead to degraded physical properties such as fatigue strength and tensile strength, as well as poor appearance issues with the final object.

Therefore, methods and systems for improving the quality of three-dimensional objects made from conductive liquid three-dimensional printers would be a step forward in the art.

SUMMARY

An embodiment of the present disclosure is directed to a three-dimensional printing system. The system comprises a build platform comprising a build surface. The printing system also includes an enclosure system having a side portion extending entirely around the build surface, a top plate portion that abuts the side portion, and a bottom portion. The side portion, the top plate portion and the bottom portion form an enclosed space surrounding the build surface. The top plate portion is moveable so as to adjust a volume of the enclosed space. A 3D printer printhead is disposed adjacent to the enclosure system for depositing a print material onto the build surface. The printing system also includes a heating system for heating the enclosed space.

An embodiment of the present disclosure is also directed to a shield system. The shield system comprises a first plate comprising a first central opening, the first plate having a width dimension. A second plate comprises a second central opening and is disposed on the first plate. The second plate has a width dimension that is smaller than the width dimension of the first plate. A third plate comprises a third central opening and is disposed on the second plate. The third plate has a width dimension that is smaller than the width dimension of the second plate. The first plate, the second plate and the third plate are stacked vertically so that the first central opening, the second central opening and the third central opening align to form an orifice in the shield system. The orifice is configured to accept a movable object. The orifice is movable in any direction within an XY plane when the first plate is held stationary.

Still another embodiment of the present disclosure is directed to a method of three-dimensional printing. The method comprises enclosing a build surface of a build platform in an enclosure system. The enclosure system has a side portion extending entirely around the build surface, a top plate portion that abuts the side portion, and a bottom portion. The side portion, the top plate portion and the bottom portion form an enclosed space surrounding the build surface. The top plate portion is moveable so as to adjust a volume of the enclosed space. The method further comprises heating the build surface in the enclosed space. A print material is deposited onto the build surface with a 3D printer printhead to form a 3D object.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

Controlling the temperature of an object during 3D manufacturing can be important for various reasons. The temperature of the 3D object during manufacture can affect the 3D object properties, including the strength of the 3D object, porosity of the 3D object and overall quality of the 3D object appearance, among other things. This can be true for 3D objects made of various materials, including polymer objects, metal objects and so forth.

As an example, during the printing process of molten metal by a conductive liquid three-dimensional printer, the temperature differential between a molten drop ejected from the printer and a build surface causes inconsistencies with the build strength, porosity and surface finish of the final 3D object. Testing has shown that to properly fuse the molten metal to the base build material the receiving surface temperature can be controlled to a desired deposition temperature. The desired deposition temperature will vary depending on the material being deposited. For aluminum (e.g., pure aluminum or aluminum alloys) this deposition temperature is about 400° C. to about 550° C., or higher. The conductive liquid three-dimensional printer system uses a heated base plate set to, for example, about 400° C., to heat the initial layers. However, as the object 4 continues to grow from the base plate, the heating from the base plate is unable to maintain the desired temperature on the upper surface so as to ensure a good bond between the molten drop and the 3D object.

The present disclosure is directed to a dynamic thermal containment system employed in conjunction with a 3D printer, such as, for example, a conductive liquid three-dimensional printer. Advantages of the system and method of the present disclosure include one or more of the following: a dynamic thermal containment system that can increase performance of build based on build time, energy used and/or the quality of the final 3D object; improved 3D printed object properties, such as lower porosity, higher yield strength, higher fatigue cycles and/or surface quality; the ability to maintain a desired temperature of the 3D object to improve material bonding during the 3D print; the ability to control the temperature of the printed object independent of the shape, size or material of the object; allow for heating the entire object (e.g., entire volume of the object) being printed regardless of changes in direction of the object during printing; the ability to avoid using high temperature drives systems for the build platform movement; allow a closed system that can maintain an inert gas environment and limit loss of inert gas from the system; and the ability to improve build properties, such as surface appearance and other 3D object properties.

Figure 1:
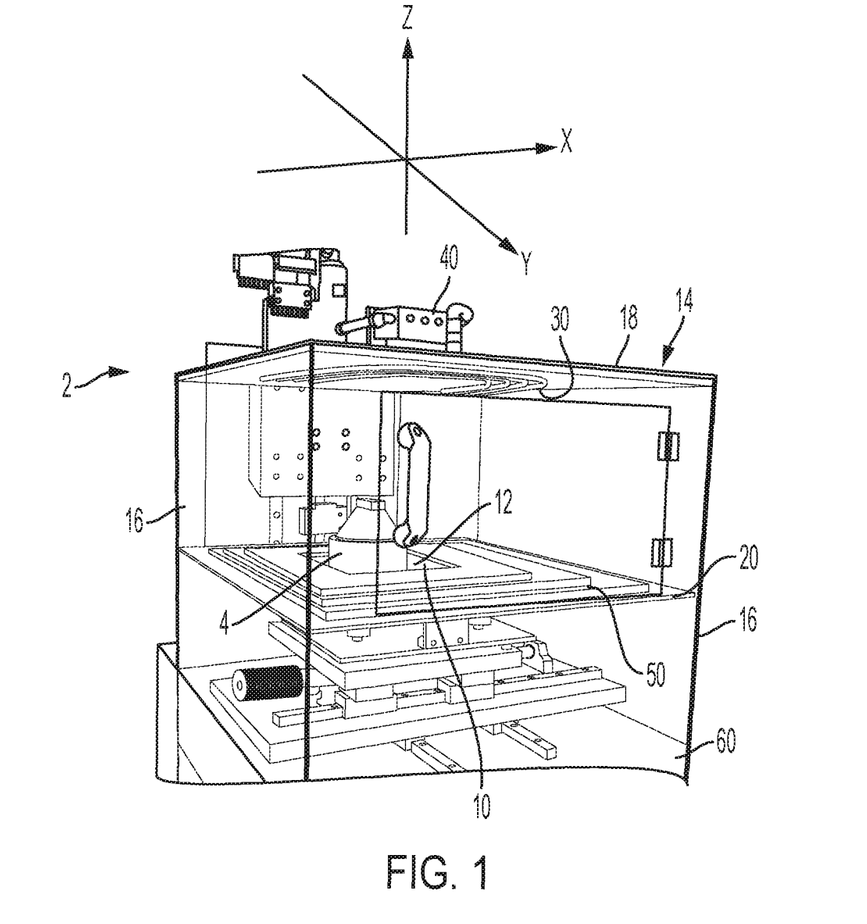
FIG. 1 shows a perspective view of a three-dimensional printing system, according to an embodiment of the present disclosure.

FIG. 1 illustrates an example of a three-dimensional printing system 2, according to an embodiment of the present disclosure. The three-dimensional printing system 2 comprises a build platform 10 (an example of which is shown more clearly in FIG. 6) including a build surface 12 on which a three-dimensional object 4 may be built. The build platform 10 in FIG. 1 is shown surrounded by an optional heat shield 50, which will be discussed in more detail below. The three-dimensional printing system 2 further comprises an enclosure system 14 that includes a side portion 16 extending entirely around the build surface 12, a top plate portion 18 that abuts the side portion, and a bottom portion 20. The side portion 16, the top plate portion 18 and the bottom portion 20 form an enclosed space surrounding the build surface 12 that allows an ambient temperature within the enclosure to be maintained at or near a desired deposition temperature. The top plate portion 18 can be moveable so as to adjust a volume of the enclosed space, thereby potentially reducing the volume of space to be heated while accommodating 3D object growth during printing. The three-dimensional printing system 2 also includes a heating system 30 for heating the enclosed space. A 3D printer printhead 40 is disposed adjacent to the enclosure system 14 for depositing a print material onto the build surface 12 through an orifice (not shown) in the top plate portion 18.

Figure 2:
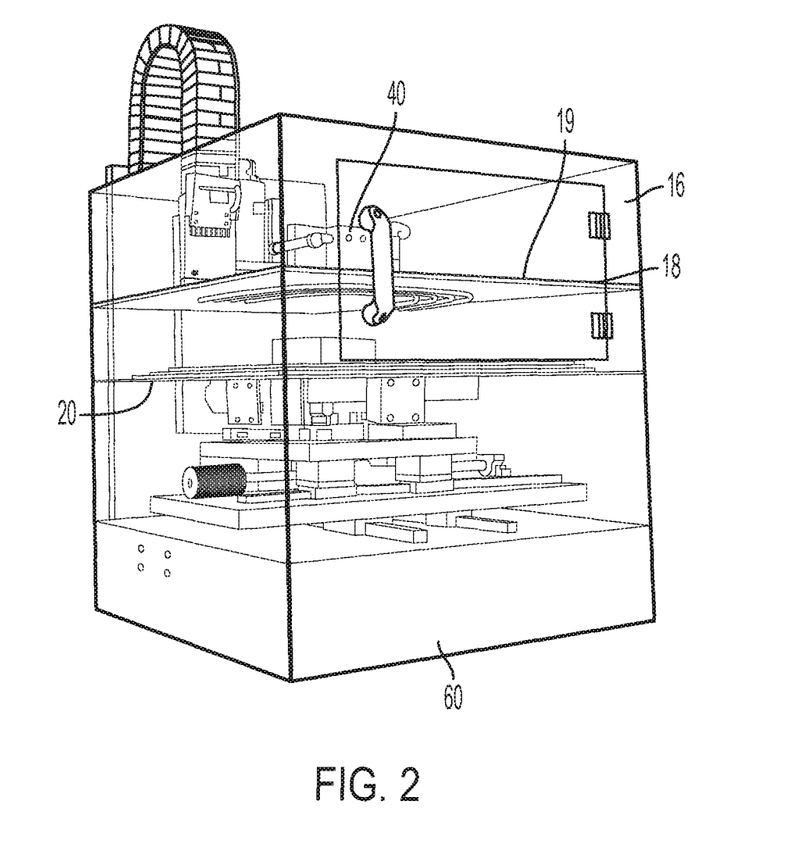
FIG. 2 shows a perspective view of a three-dimensional printing system, according to an example of the present disclosure.
Figure 3:
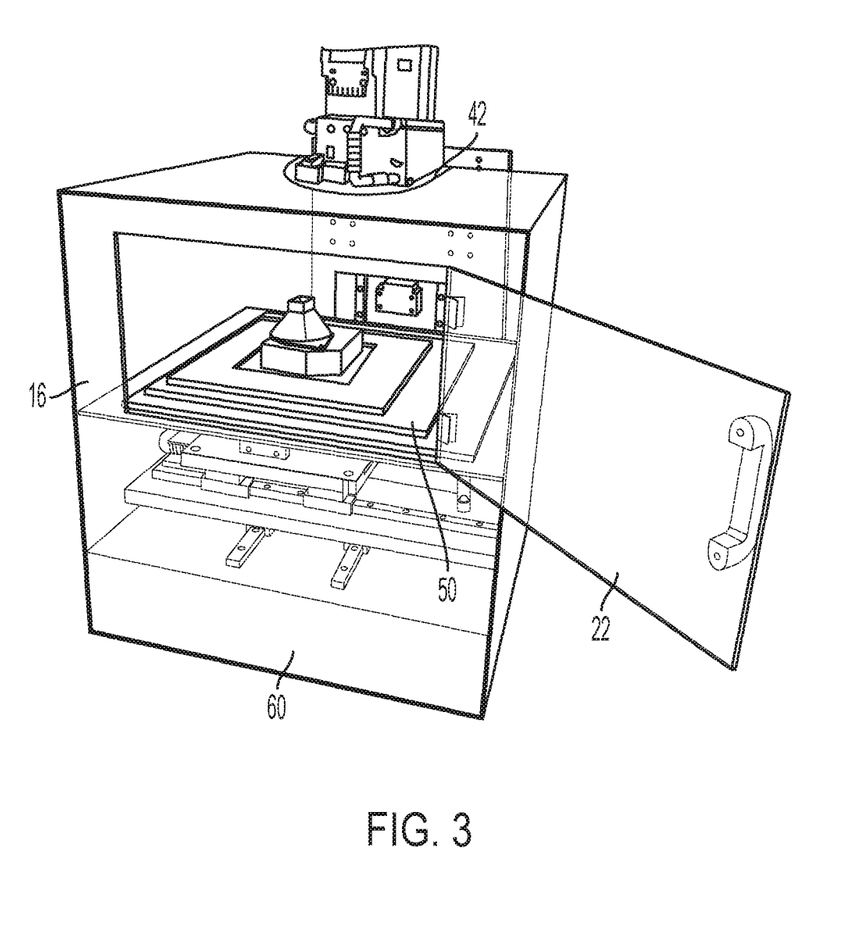
FIG. 3 shows a perspective view of a three-dimensional printing system, according to an example of the present disclosure.

In an embodiment, a position of the printhead 40 and the top plate portion 18 are both adjustable along a z-axis, as shown in FIG. 1. In FIG. 1 the top plate portion 18 is shown at a topmost position of the enclosed space, while in FIG. 2 the top plate portion 18 is shown at a lowered position along the z-axis. In an embodiment, a printhead mount plate 42 on which the printhead 40 is attached is positioned within a region of the top plate portion 18, as shown in FIG. 3. Using the printhead mount plate 42, the printhead is attached to the top plate portion 18 so that when the print head moves up and down along the z-axis, the top plate portion 18 also moves along the z-axis. During printing, the printhead 40 and top plate portion 18 can be lowered into position over the build surface 12 so as to be at a desired distance therefrom. As the 3D object 4 is printed, the printhead 40 can then be raised to deposit successive layers of the 3D object 4 on the build surface 12. As the size of the 3D object 4 grows up from the build surface 12 during the printing process, the printhead 40 and top plate portion 18 can be incrementally raised to accommodate the increasing size of the 3D object 4.

In an embodiment, the top plate portion 18 comprises a seal 19 (shown as a line in FIG. 2) disposed at the position where top plate portion 18 abuts the side portion 16. The side portion 16 and bottom portion 20 can also be sealed. Employing such seals can aid in reducing or eliminating unwanted gases from entering the enclosure system, such as between the top plate portion 18 and side portion 16, which can be useful for maintaining an inert gas atmosphere within the enclosure system 14. In addition, the seal can allow the top plate portion 18 to slide up and down on the z-axis relative to the side portion 16. The seal can comprise a gasket material that can withstand the build temperatures, such as NOMEX®.

The side portion 16 and top plate portion 18 can be any suitable materials that can withstand the heat of the 3D print process without degrading while providing the desired structural stability and/or other desired properties, such as thermal insulation and/or air impermeability. Examples of suitable materials include metals, ceramics, glass and so forth. The materials for the top portion 18 can be the same or different as the side portion 16. While the enclosure is shown to have a cubic shape, any desired shape can be employed, such as a cylindrical shape.

In an embodiment, the bottom portion 20 comprises a heat shield 50 that extends from the build platform 10 and abuts the side portion 16, as shown, for example, in FIG. 1. As is well known in the art, the position of the build platform 10 is adjustable along the x-axis and the y-axis of an XY plane so as to allow the print material from the printhead to be deposited in a desired location on the build platform during printing. The heat shield 50 comprises an orifice that is configured to accept a movable object, such as the build platform 10. The heat shield orifice is capable of two degrees of motion and is movable in any direction within the XY plane so as to match the lateral, angular and radial movements of the build platform 10 during printing. Alternatively, a heat shield 50 is not employed, in which case the bottom portion 20 of the enclosure system 14 can be another surface, such as, for example, a base 60.

The enclosure system 14 can include a closed-loop temperature control system for maintaining a desired temperature with the enclosed space. Such a closed loop system may comprise a temperature sensor and feedback loop for controlling the heat output of the heating system 30. As shown in FIG. 3, the enclosure system may also include a door 22 for providing access to the enclosure system 14.

Figure 4:
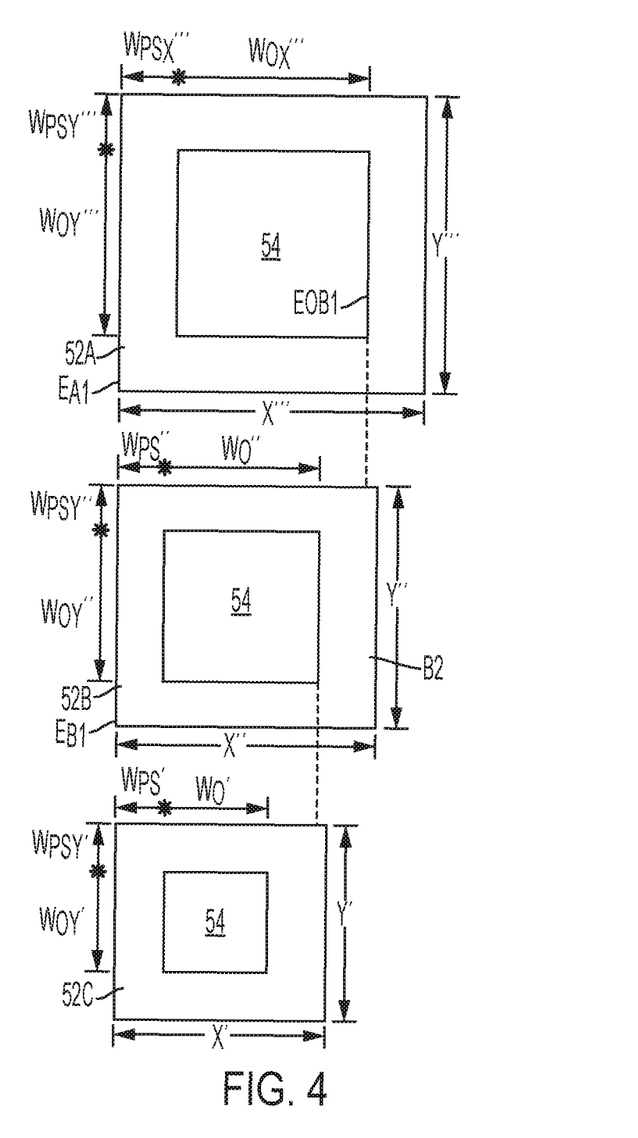
FIG. 4 shows a top view of plates employed in a heat shield, according to an embodiment of the present disclosure.
Figure 5A:
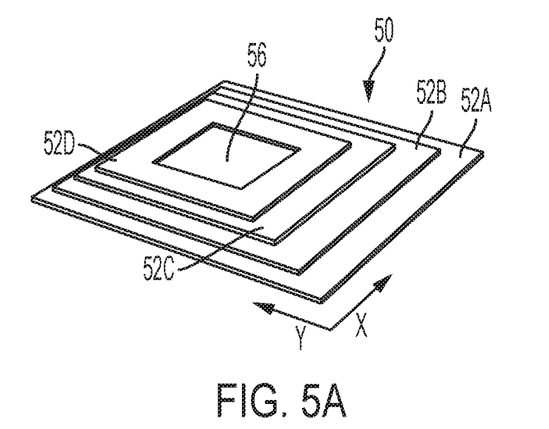
FIG. 5A shows a perspective top view of a heat shield having an orifice in a first position, according to an embodiment of the present disclosure.
Figure 5B:
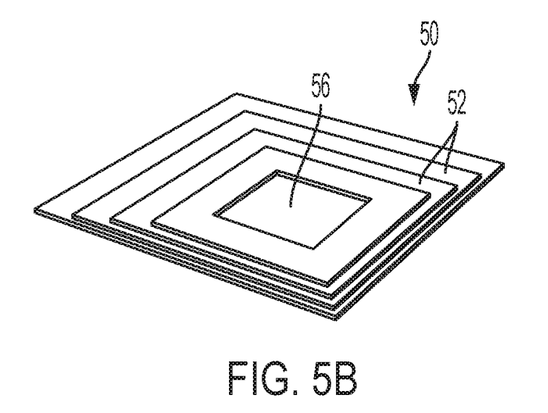
FIG. 5B shows a perspective top view of the heat shield of FIG. 5A for which the orifice has been moved to a second position that is different from the first position, according to an embodiment of the present disclosure.

FIGS. 4, 5A and 5B illustrate a heat shield 50, according to an embodiment of the present disclosure. As shown in FIG. 4, heat shield 50 comprises two or more separate plates 52, such as 3 to 50 plates, or 4 to 20 plates, or 4 to 10 plates. Each of the plates 52 comprise a central opening 54. As shown in FIG. 5A, the plates 52 are stacked vertically so that the openings 54 align to form an orifice in the heat shield 50 through which the build platform 10 extends. The plates 52 are sized to avoid formation of gaps in the x or y direction between any of the plates regardless of the position of the orifice in the XY plane, thereby forming a continuous shield surrounding the orifice. Referring again to FIG. 4, each of the plates 52 in the stack has one or more smaller dimensions than the plate 52 on which it is stacked, so as to allow the orifice and the build platform 10 to move together in any direction within the XY plane. For example, in the case where plates 52 are rectangular, as shown in FIG. 4, dimensions x', y' of plate 52C will be smaller than x", y" of plate 52B, and x", y" will be smaller than x''', y''' of plate 52A. For other plate configurations, one or more of the dimensions of the plates 52 may be incrementally decreased with each successive plate. For example, where the plates 52 are circles, a diameter of the plates 52 may be decreased for each successive plate in the stack. In the case of polygons with 3 or more sides, the dimensions of one or more, such as all, of the sides may be decreased for each successive plate in the stack.

Further, the dimensions of each of the plates 52 will be large enough to effectively cover the opening 54 of the plate 52 that is directly below in the stack for the entire range of motion of the plates in the stack. As an example, the dimension x" of plate 52B can be equal to or greater than a width, Wox''', of the opening 54 of plate 52A plus the width, Wpsx''', of the side of plate 52A. That way, when the edge, EB1, of plate 52B is positioned all the way to the edge, EA1, of plate 52A, the opposite side B2 of plate 52B will overlap, or at least extend to, the far edge, EOB1 of opening 54 of plate 52A. In similar manner, a side of each of the plates 52 will cover the far edge of the opening 54 of the plate directly below in the stack during the entire range of motion of the stack.

Once stacked, the movement of the build platform 10 can force the plates 52 to slide relative to each other in any desired direction in the XY plane, such as by a telescoping motion of plates 52. FIGS. 5A and 5B illustrate a heat shield 50 comprising four sliding plates 52A to 52D that allows freedom of movement in the XY plane while providing protection for the drive systems of the three-dimensional printing system. The top plate 52D includes an orifice 56 which can be configured in any desired shape and size to attach to the build platform 10 (FIG. 1). Bottom plate 52A is attached to the side portion 16 and can be held stationary thereby. Plates 52B, 52C and 52D slide relative to each other and to plate 52A when a force is applied by build platform 10, thereby moving the orifice 56 from, for example, a first position as shown in FIG. 5A to a second position as shown in FIG. 5B. Motion in both the X and Y directions can be completed simultaneously, thereby allowing for complex two dimensional moves by the build platform 10.

The plates are not physically connected in the stack, but are held together by gravity and supported by the bottom plate 52A, which is attached to the side portion 16 of the enclosure system and held stationary thereby. A gasket material for providing a seal and/or a lubricant, such as graphite or liquid lubricant, can optionally be disposed between the plates. The plates 52 can be made of any desired material that can withstand the processing temperatures, such as one or more materials chosen from ceramics, metals, such as steel, aluminum or other metals, or polymers, such as a high temperature polymer that can withstand temperatures of 350° C. or more, such as 400° C., 500° C. or 600° C. or more without degrading.

The heat shield 50 can act to prevent the drive system for moving the build platform 10 from being exposed to high temperatures, which can potentially damage and/or reduce the life of the drive system. In an alternative embodiment where a heat shield 50 is not used, high temperature drive systems can be used for moving the build platform 10 that are designed to withstand the build temperatures (e.g., temperatures ranging from about 400° C. to about 550° C.). Such high temperature drive systems are well known in the art.

In an embodiment, the heating system 30 comprises at least one heat source chosen from a radiant heating system, a conductive heating system and a convection heating system. A radiant heating system comprising infrared ("IR") lamps attached to a surface of the top plate portion 18 is illustrated as the heating system 30 in FIG. 1. An example of commercially available infrared lamps are nested, curved infrared heating tubes made by Noblelight Heraeus of Hanau, Germany. The IR heating tubes can have any suitable diameter, for example, an 8 mm diameter. Any other suitable type of radiant heating system can be employed, including radiant heating systems attached anywhere inside or outside of the enclosure so as to heat the build platform 10 and/or a three-dimensional object 4 to be built thereon. Any suitable convection heating system 32 (FIG. 6) can be employed. For example, the convection heating system 32 can flow heated gas, such as an inert gas or air, through the enclosure so as to heat the build platform 10 and/or the three-dimensional object 4 to be built thereon. Any suitable inert gas can be used, such as argon or nitrogen. The use of inert gas can reduce unwanted reactions of oxygen with the metals, such as magnesium in an aluminum alloy, as an example. Any suitable conduction heating system 34 can be employed. For example, a conduction heating system 34 can include a system for heating the build platform 10, such as by employing electric coils or other heating mechanisms within or proximate to the build platform 10. Any other suitable techniques for heating the enclosure system 14 can be used in place of or in combination with the heating systems discussed herein. In an embodiment, two or more, such as all three, of the radiant heating system, convection heating system and conductive heating system can be employed.

The printhead 40 can be any printhead useful for 3D printing. Various suitable types of printheads are known in the art. Examples include extruder type printheads, which are often used for 3D printing, as is well known in the art.

In an embodiment, the three-dimensional printing system 2 includes a printhead 40 that is configured for ejecting drops of a conductive liquid print material (e.g., molten aluminum or other liquid metals) onto the build platform 10.

The printhead comprises an electromagnetic coil for applying a DC pulse for ejecting the drops, as is described below. Printheads employing other suitable mechanisms for ejecting drops of conductive liquid print could also be used as printhead 40.

Figure 6:
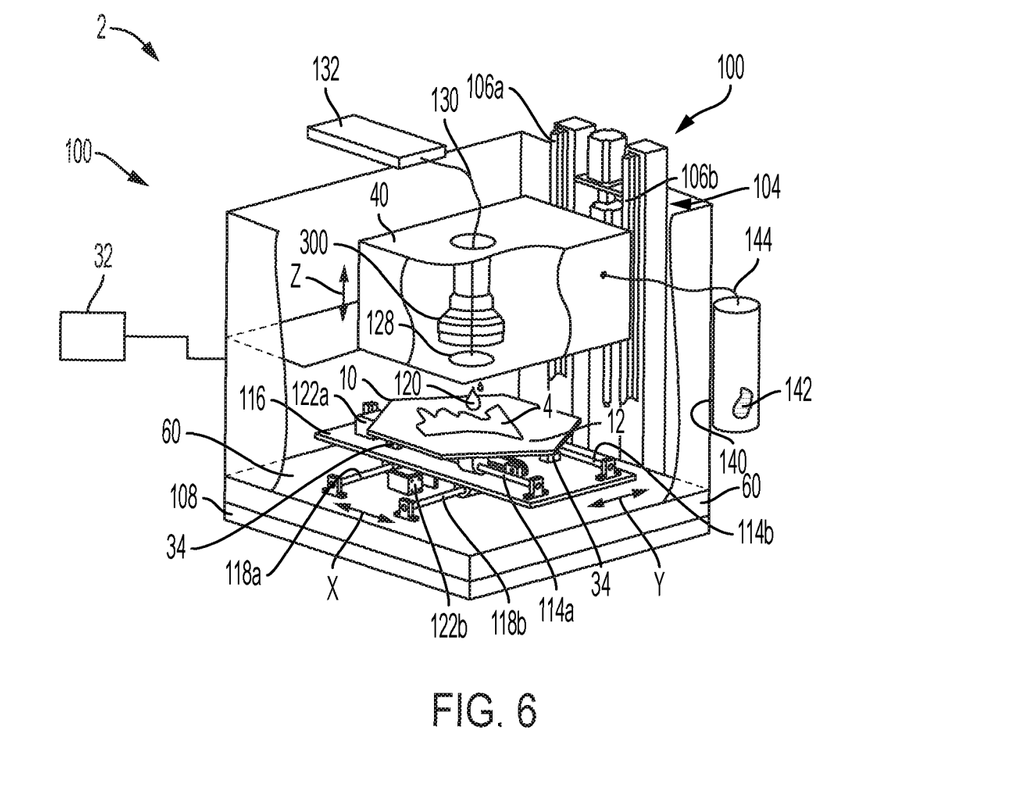
FIG. 6 shows a perspective, schematic view of a three-dimensional printing system with a portion of the thermal containment system and printhead cover cutaway to show details of the printhead, according to an embodiment of the present disclosure.

FIG. 6 illustrates an example of a conductive liquid three-dimensional printing system, referred to herein as a liquid metal 3D printer 100. Drops of liquid metal that are used to form a three-dimensional metal object are produced by a printhead 40 supported by a tower 104. The printhead 40 is affixed to vertical z-axis tracks 106a and 106b and can be vertically adjusted, represented as movement along a z-axis, on tower 104. Tower 104 is supported by a frame 108 manufactured, for example, from steel tubing or any other suitable material.

Proximate to frame 108 is a base 60, formed of, for example, granite or other suitable material. Base 60 supports the base platform 10 upon which a 3D object is formed. Base platform 10 is supported by x-axis tracks 114a and 114b, which enable base platform 10 to move along an x-axis. X-axis tracks 114a and 114b are affixed to a stage 116. Stage 116 is supported by y-axis tracks 118a and 118b, which enable stage 116 to move along a y-axis.

As drops of molten metal (e.g., molten aluminum or other suitable metal) 120 fall onto base platform 10, the programmed horizontal movement of base platform 10 along the x and y axes results in the formation of a three-dimensional object. The programmed movement of stage 116 and base platform 10 along x-axis tracks 114a and 114b, and y-axis tracks 118a and 118b can be performed by means of, for example, an actuator 122a and 122b, as would be known to a person of ordinary skill in the art. The actuators 122a and 122b and tracks make up a drive system for the build platform 10. The drive system may or may not be high temperature system as described above. Liquid metal 3D printer 100 was designed to be operated in a vertical orientation but other orientations could also be employed.

FIG. 6 also shows a source of aluminum 132 and aluminum wire 130. Alternative embodiments may utilize aluminum in bar, rod, granular or additional forms. In alternative embodiments, any sufficiently conductive liquid or colloidal mixture could be used in place of aluminum with the proper adjustments to the system, as would be understood by one of ordinary skill in the art. The term aluminum as used herein is defined to include both pure aluminum and aluminum alloys, such as, for example, the 300 series (e.g., 356), 2000 series, 3000 series, 4000 series (e.g., 4043), 5000 series, 6000 series (e.g., 6061), 7000 (e.g., 7075) series and 8000 series of alloys, or any other aluminum alloys suitable for 3D printing. Pure aluminum is defined as being 99% by weight aluminum or higher, such as about 99.5% by weight to about 100% aluminum, and includes, for example, the 1000 series of aluminum.

Printhead 40 includes a nozzle pump 300. Liquid metal 3D printer 100 and the method of operating the printer are described in greater detail in U.S. Pat. No. 9,616,494, the disclosure of which is incorporated herein by reference in its entirety.

Figure 7:
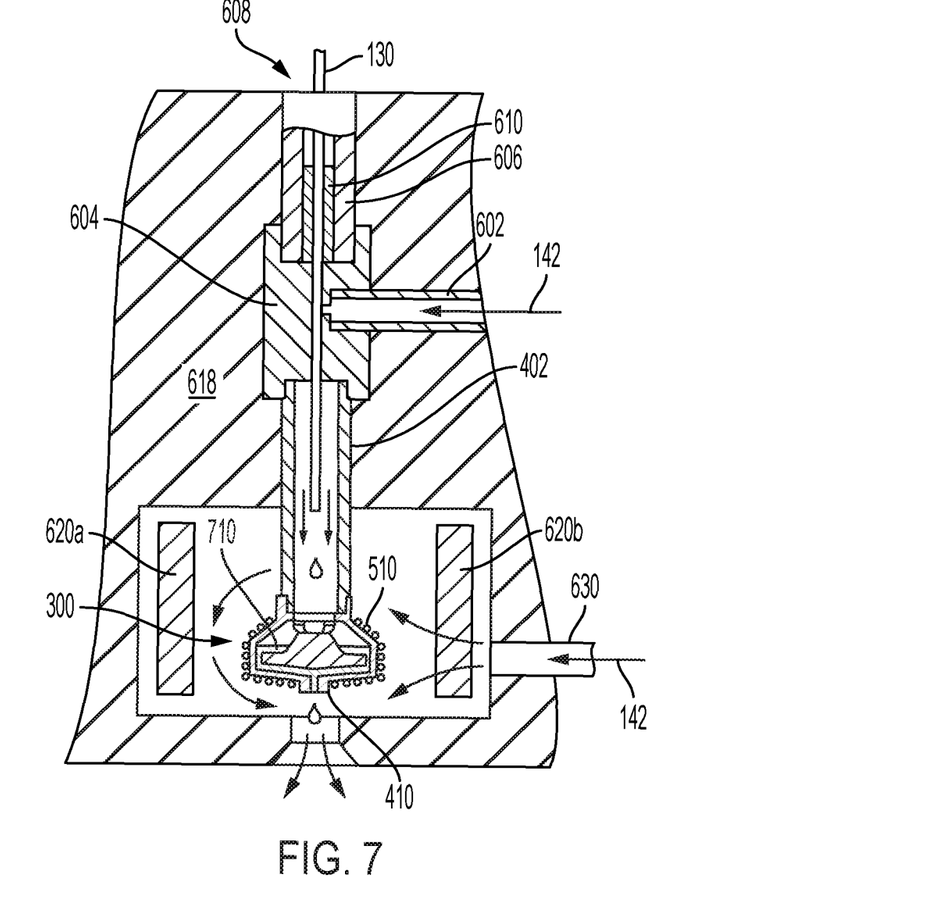
FIG. 7 shows a cross sectional view of the printhead shown in FIG. 6, according to an embodiment of the present disclosure.

FIG. 7 illustrates a cross-sectional view of a portion of printhead 40, which includes a cooled wire inlet 608, an outer sleeve 606, and the nozzle pump 300 enclosed by an electromagnetic coil 510. In an embodiment, aluminum wire 130 is fed into cooled wire inlet 608 and a wire guide and gas seal 610 made of copper. The aluminum wire 130 then passes through an insulating coupler 604, made, for example, of Macor ceramic, where inert gas 142 is supplied through the melt shield gas inlet port 602, also made of, for example, Macor ceramic, to apply a protective inert gas 142 shield before the aluminum is melted.

Melted aluminum, or other electrically conductive liquid, flows downward under gravity and positive pressure exerted by inert gas 142 along a longitudinal z-axis to nozzle pump 300. Electrical heating elements 620a and 620b, made of, for example, nichrome, heat the interior of a furnace 618, made of, for example, firebrick, to a desired temperature (e.g., above the 660° C., which is the melting point of aluminum). The thermally conductive tundish 402 transmits heat to aluminum wire 130, as supplied from a source of aluminum 132, causing it to melt as it enters nozzle pump 300. Tundish 402 can comprise, for example, boron nitride or other suitable thermally conductive material.

The molten aluminum flows downward to form a charge of molten aluminum 710. Charge of molten aluminum 710 is contained primarily within a pump chamber of nozzle pump 300. Electromagnetic coil 510 is shaped to surround nozzle pump 300. The pressure on the inert gas 142 inside nozzle pump 300 is adjusted to overcome surface tension at the nozzle 410 in order to form a convex meniscus (not shown). This pressure is determined by Young's law as $P = 2 \times$ surface tension/orifice radius of the nozzle 410.

The electromagnetic coil 510 are shaped around nozzle pump 300 in such a way as to focus magnetic field lines vertically through the charge of molten aluminum 710. Nozzle pump 300 is transparent to the magnetic field. The electromagnetic coil 510 applies forces to the charge of molten aluminum 710 to pump liquid metal based on the principles of magnetohydrodynamics. A step function direct current (DC) voltage profile applied to the electromagnetic coil 510 causes a rapidly increasing applied current to electromagnetic coil 510, thereby creating an increasing magnetic field that follows magnetic field lines. The optimal range of voltage for the pulse and current strength, as well as the range of time durations for the pulse, for effective operation vary depending on the electrical resistivity of the fluid, viscosity and surface tension. The possible effective range is wide, where alternative embodiments could optimally range from 10 to 1000 volts (V) and 10 to 1000 amperes (A).

According to Faraday's law of induction, the increasing magnetic field causes an electromotive force within the pump chamber, which in turn causes an induced current in molten aluminum 710 to flow along circular paths through the charge of molten aluminum 710. The induced current in molten aluminum 710 and the magnetic field produce a resulting radially inward force on molten aluminum, known as a Lorenz force, in a ring shaped element through the charge of molten aluminum 710. The radially inward force on molten aluminum is proportional to the square of the DC voltage applied.

A peak pressure occurring at the inlet to the nozzle 410 is also proportional to the square of the DC voltage applied. This pressure overcomes surface tension and inertia in the molten aluminum to expel the drop of molten aluminum. At the same time, a computer causes stage 116 to move to deposit the drop of molten aluminum in the desired location on base platform 10 (e.g., on the 3D object being printed).

An embodiment of the present disclosure is directed to a method of three-dimensional printing. The method comprises enclosing a build surface of a build platform in an enclosure system, such as any of the enclosure systems described herein. The enclosure system has a side portion extending entirely around the build surface, a top plate portion that abuts the side portion, and a bottom portion. The side portion, the top plate portion and the bottom portion form an enclosed space surrounding the build surface. The top plate portion is moveable so as to adjust a volume of the enclosed space. The build surface is heated in the enclosed space. A print material is deposited onto the build surface using a 3D printer printhead to form a 3D object. The method comprises depositing the print material, such as by, for example, ejecting a first drop of a molten metal from the printhead so as to deposit the first drop on a preheated drop contact point at a first deposition temperature, as described herein above. The method further comprises adjusting the position of the top plate portion and the printhead along a z-axis. The method further comprises adjusting the position of the build surface along an x-axis, a y-axis or both the x-axis and the y-axis. An orifice of a heat shield, as described herein, can move within the XY plane so as to match one or more of the build platform lateral, angular and radial movements.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A three-dimensional printing system, the system comprising:
   a build platform comprising a build surface;
   an enclosure system having a side portion extending entirely around the build surface, a top plate portion that abuts the side portion, and a bottom portion, the side portion, the top plate portion and the bottom portion forming an enclosed space surrounding the build surface, the top plate portion being moveable so as to adjust a volume of the enclosed space, the bottom portion comprising a heat shield that extends from the build platform and abuts the side portion;
   a 3D printer printhead disposed adjacent to the enclosure system for depositing a print material onto the build surface; and
   a heating system for heating the enclosed space,
   wherein the heat shield comprises two or more separate plates comprising a central opening, the plates being stacked vertically in a stack so that the opening of the plates align to form an orifice in the heat shield through which the build platform extends, each plate in the stack having a smaller dimension than the plate on which it is stacked so as to allow the orifice and the build platform to move together in any direction within an XY plane.

2. The system of claim 1, wherein a position of the printhead and the top plate portion are both adjustable along a z-axis.

3. The system of claim 1, further comprising a printhead mount plate positioned within a region of the top plate portion, the printhead being attached to the printhead mount plate.

4. The system of claim 1, wherein the heating system comprises at least one heat source chosen from a radiant heating system, a conductive heating system and a convection heating system.

5. The system of claim 1, wherein the heating system comprises a radiant heating system.

6. The system of claim 1, wherein the heating system comprises a convection heating system.

7. The system of claim 1, wherein the top plate portion comprises a seal disposed at the position where top plate portion abuts the side portion.

8. The system of claim 1, wherein the plates are sized to avoid formation of gaps between the plates in an x or y direction of the XY plane, thereby forming a continuous shield surrounding the build platform.

9. The system of claim 1, wherein the printhead is configured for ejecting drops of a conductive liquid print material onto the build platform.

10. The system of claim 9, wherein the printhead comprises an electromagnetic coil for applying a DC pulse for ejecting the drops.

11. A method of three-dimensional printing, the method comprising:
   enclosing a build surface of a build platform in an enclosure system, the enclosure system having a side portion extending entirely around the build surface, a top plate portion that abuts the side portion, and a bottom portion, the side portion, the top plate portion and the bottom portion forming an enclosed space surrounding the build surface, the top plate portion being moveable so as to adjust a volume of the enclosed space;
   heating the build surface in the enclosed space;
   adjusting the position of the build surface along an x-axis, a y-axis or both the x-axis and the y-axis,
   during the adjusting of the position of the build surface, a heat shield moving within an XY plane, the heat shield comprising two or more separate plates comprising a central opening, the plates being stacked vertically in a stack so that the opening of the plates align to form an orifice in the heat shield through which the build platform extends, each plate in the stack having a smaller dimension than the plate on which it is stacked so as to allow the orifice and the build platform to move together in any direction within the XY plane; and depositing a print material onto the build surface with a 3D printer printhead to form a 3D object.

12. The method of claim 11, wherein depositing the print material comprises ejecting a first drop of a molten metal from the printhead so as to deposit the first drop on a preheated drop contact point at a first deposition temperature.

13. The method of claim 11, further comprising adjusting the position of the top plate portion and the printhead along a z-axis.

14. The method of claim 11, wherein the plates are sized to avoid formation of gaps between the plates in an x or y direction of the XY plane, thereby forming a continuous shield surrounding the build platform during the adjusting of the position of the build surface.

15. A three-dimensional printing system, the system comprising:
   a build platform comprising a build surface;
   an enclosure system having a side portion extending entirely around the build surface, a top plate portion that abuts the side portion, and a bottom portion, the side portion, the top plate portion and the bottom portion forming an enclosed space surrounding the build surface, the bottom portion comprising a heat shield that extends from the build platform and abuts the side portion;
   a 3D printer printhead disposed adjacent to the enclosure system for depositing a print material onto the build surface; and
   a heating system for heating the enclosed space,
   wherein the heat shield comprises: a first plate and a second plate, the first plate comprising a first central opening and a first width dimension, the second plate comprising a second central opening and being disposed on the first plate, the second plate having a second width dimension that is smaller than the first width dimension, the first plate and the second plate being stacked vertically so that the first central opening and the second central opening align to form an orifice through which the build platform extends, the first plate and the second plate being slidable relative to each other so as to allow the orifice and the build platform to be moveable together in any direction within an XY plane when the first plate is held stationary.

16. The system of claim 15, wherein the heat shield further comprises a third plate comprising a third central opening and being disposed on the second plate so that the third central opening aligns with the first central opening and the second central opening to form the orifice, the third plate having a width dimension that is smaller than the width dimension of the second plate, the third plate slidable relative to the first plate and the second plate.

17. The system of claim 16, wherein the first plate, the second plate and the third plate comprise a material chosen from ceramics, metals, high temperature polymers and mixtures thereof.

18. The system of claim 16, wherein the shield system includes one or more additional plates, each additional plate including a central opening, each additional plate having a width dimension that is smaller than the width dimension of the plate on which it is disposed.

19. The system of claim 16, wherein the plates are sized to avoid formation of gaps between the plates in an x or y direction of the XY plane, thereby forming a continuous shield surrounding the orifice.

* * * * *